(12) United States Patent
Alter et al.

(10) Patent No.: US 10,024,694 B1
(45) Date of Patent: Jul. 17, 2018

(54) APPARATUS AND METHOD FOR MEASURING KINEMATIC PROPERTIES

(71) Applicants: Daniel Alter, Seattle, WA (US); Margaret Lueille Milanowski, Seattle, WA (US)

(72) Inventors: Daniel Alter, Seattle, WA (US); Margaret Lueille Milanowski, Seattle, WA (US)

(*) Notice: Subject to any disclaimer, the term of this patent is extended or adjusted under 35 U.S.C. 154(b) by 0 days.

(21) Appl. No.: 15/897,834

(22) Filed: Feb. 15, 2018

Related U.S. Application Data (60) Provisional application No. 62/461,109, filed on Feb. 20, 2017.

(51) Int. Cl.
| | |
|---|---|
| *G01D 5/26* | (2006.01) |
| *G01P 3/36* | (2006.01) |
| *G01P 15/00* | (2006.01) |
| *H04B 10/70* | (2013.01) |

(52) U.S. Cl.
CPC ........... *G01D 5/26* (2013.01); *G01P 3/36* (2013.01); *G01P 15/003* (2013.01); *H04B 10/70* (2013.01)

(58) Field of Classification Search
CPC ... G01D 5/26; G01P 15/003; G01P 3/36; H04B 10/70

USPC ............................... 250/208.6, 238
See application file for complete search history.

(56) References Cited

U.S. PATENT DOCUMENTS

| | | | |
|---|---|---|---|
| 7,359,064 B1 * | 4/2008 | Bander | G01B 11/002 356/496 |
| 2006/0249670 A1 * | 11/2006 | Monroe | B82Y 10/00 250/283 |

* cited by examiner

*Primary Examiner* — Seung C Sohn (57) ABSTRACT

Disclosed is an apparatus for measuring a kinematic property of a first object relative to a second object. The apparatus includes a first communicator associated with a first object and a second communicator associated with a second object. The first communicator includes a first frame and at least four first entangled clocks disposed on the first frame. Yet further, the first communicator includes a first plurality of photo detectors corresponding to the at least four first entangled clocks. Further, the first communicator includes a first processor communicatively coupled to the first plurality of photo detectors. Further, the first communicator includes a first power. The second communicator includes a second frame and at least four second entangled clocks disposed on the second frame. Yet further, the second communicator includes a second plurality of photo detectors. Moreover, the second communicator includes a second power supply.

20 Claims, 7 Drawing Sheets

APPARATUS AND METHOD FOR MEASURING KINEMATIC PROPERTIES

The current application claims a priority to the U.S. Provisional Patent application Ser. No. 62/461,109 filed on Feb. 20, 2017.

FIELD OF THE INVENTION

The present invention relates generally to a measurement apparatus. More specifically, the present invention relates to an apparatus for measuring kinematic properties of an object by taking advantages of the principles of quantum entanglement.

BACKGROUND OF THE INVENTION

According to the second postulate of Einstein's special relativity, 'c', the speed of light in a vacuum, is a constant with respect to all frames of reference. This has been confirmed in observations as well.

Therefore, this constant gives a base reference frame to measure our location and speed with respect to anywhere else in our universe. All information that is required is how to measure our speed with respect to 'c'. Advancements into quantum mechanics have recently discovered a scientific phenomenon known as quantum entanglement. According to developments and research into the topic, quantum entanglement describes the ability for two entangled particles to interact with each other, simultaneously, with no relativistic effects due to distance or other phenomena resulting from traditional Newtonian physics. The applications for this discovery, in conjunction with the constant nature of 'c', include the potential for instantaneous long-distance communication, as a user can adjust the position of one entangled particle to cause a change in another particle, which can enable a properly designed device to send a signal to another user.

Thus, it would be advantageous to develop a method and system for instantaneous long-distance communication.

SUMMARY OF THE INVENTION

This summary is provided to introduce a selection of concepts in a simplified form that are further described below in the Detailed Description. This summary is not intended to identify key features or essential features of the claimed subject matter. Nor is this summary intended to be used to limit the claimed subject matter's scope.

Disclosed is an apparatus for measuring a kinematic property of a first object relative to a second object. The apparatus includes a first communicator associated with a first object and a second communicator associated with a second object. The first communicator includes a first frame. Further, the first communicator includes at least four first entangled clocks configured to periodically emit photons, wherein the at least four first entangled clocks are disposed on the first frame. Yet further, the first communicator includes a first plurality of photo detectors corresponding to the at least four first entangled clocks, wherein the plurality of first photo detectors is configured to detect photons. Further, the first communicator includes a first processor communicatively coupled to the first plurality of photo detectors, wherein the first processor is configured to compute a first kinematic property of the first object relative to the second object based on signals received from the first plurality of photo detectors. Further, the first communicator includes a first power supply configured to provide electrical power to each of the at least four first entangled clocks, the plurality of first photo detectors and the first processor. The second communicator includes a second frame. Further, the second communicator includes at least four second entangled clocks configured to periodically emit photons, wherein a quantum state of each of the at least four second entangled clocks is entangled with a quantum state of a corresponding first entangled clock of the at least four first entangled clocks. Yet further, the second communicator includes a second plurality of photo detectors corresponding to the at least four second entangled clocks, wherein the plurality of second photo detectors is configured to detect photons. Moreover, the second communicator includes a second power supply configured to provide electrical power to each of the at least four second entangled clocks and the second plurality of photo detectors.

According to some aspects, a method of measuring a kinematic property of a first object relative to a second object is disclosed. The method includes creating entanglement between a quantum state associated with at least four first entangled clocks comprised in a first communicator and a quantum state associated with at least four second entangled clocks comprised in a second communicator, wherein each of at least four first entangled clocks and the at least four second entangled clocks is configured to emit photons. Further, the method includes detecting, using a plurality of first photo detectors comprised in the first communicator, photons emitted by the at least four first entangled clocks. Yet further, the method includes computing, using a first processor comprised in the first communicator, a first kinematic property of the first object relative to the second object based on the detecting. Moreover, the method includes presenting, using a first readout comprised in the first communicator, a representation of the first kinematic property.

According to some aspects, the present disclosure provides a means of determining kinematic properties such as the location, speed, and velocity of an object. The present disclosure provides means for measuring these kinematic properties by taking advantage of the principles of quantum entanglement to track the positional changes of a set of quantum clocks located on coupled apparatuses, so that a user can determine changes in one apparatus relative to the other.

According to further aspects, the present disclosure utilizes the scientific principles that the speed of light in a vacuum is a constant in every time frame, and that entangled particles interact instantaneously, to enable instantaneous communication. The disclosed apparatus utilizes a pair of communicators to enable data transmission, collection, and display. Each communicator is equipped with a set of lasers, entangled clocks, detectors, processors, and displays, which together enable precise determination of the kinetic properties of attached objects relative to each other. For example, if one communicator is placed upon Earth and another is placed upon a satellite, the two calibrated communicators can track orientation and distance changes relative to each other. By programming a processor to calculate these values instantaneously, a user can identify the speed and three-dimensional direction of changes, thus enabling interpretation of velocity between the communicators. Such communication will enable truly live updates between personnel on the ground and in space during astronomical voyages, which will prove invaluable as engineering development in space continues.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of measuring kinematic properties, embodiments of the present disclosure are not limited to use only in this context.

Overview

The present disclosure relates to a relative-to-c velocity meter that enables a user to determine one or more of location, speed, and velocity of an attached object by utilizing a set of entangled clocks. 'c' is the speed of light. Further, the relative-to-c velocity meter may be used to verify that separated entangled clocks moving at different relativistic speeds cannot maintain entanglement. The theory of relativity predicts that separated clock speeds must differ. Yet further, the velocity meter may be used to keep track of the accumulated relativistic time differences over long term space travels in one or more of spaceships, satellites and space probes. The real time communication with remote unmanned probes will allow instant control over their actions.

The disclosed relative-to-c velocity meter comprises a first communicator and a second communicator. The first communicator is a device positioned relative to the second communicator that enables receipt, interpretation, and display of data from the second communicator. The first communicator comprises a frame, at least four entangled clocks, a plurality of light cords, an inner detecting sphere, an outer detecting sphere, a processor, a power supply, and a readout. In an embodiment, the frame may include a set of supports arranged in an equilateral pyramidal orientation. The frame may include at least four corners. The at least four corners enable proper support and orientation of the at least four entangled clocks relative to the inner detecting sphere. Each entangled clock of the at least four entangled clocks of the first communicator reacts to changes in its respective paired entangled clock within the second communicator. With at least four entangled clocks on the two communicators, instantaneous directional changes in the first communicator are expressed as changes in the distances of each of the at least four entangled clocks relative to their partnered entangled clocks in the second communicator, and vice-versa. The plurality of light cords is a set of extruded cylindrical units, preferably fiber optic wires or similar materials, capable of transmitting high-quality data from light inputs. The plurality of light cords may connect the at least four entangled clocks to the inner detecting sphere, and also connect the inner detecting sphere to the outer detecting sphere. This arrangement enables measurement of the speed of light as it travels from the at least four entangled clocks to the inner detecting sphere, and as it subsequently bounces between the inner detecting sphere and the outer detecting sphere. The inner detecting sphere is a generally spherical optical sensor placed at the geometric center of the frame. The spherical shape enables receipt of signals from each of the at least four corners of the frame. The outer detecting sphere is a generally spherical optical sensor placed generally around the frame, so that the at least four corners of the frame each rest tangent to the outer detecting sphere, generally opposite the connecting points of the plurality of light cords to the inner detecting sphere. The processor may be any of a variety of computer processors capable of converting signals from the outer detecting sphere into data that can be interpreted by humans and shown on the readout. In an exemplary embodiment, the processor comprises a math coprocessor. The math coprocessor is a supplemental logic core of the processor that enables calculation and mathematical interpretation of displacement results from the outer detecting sphere. The readout is any of a variety of displays, including flat screen, LCD screens, and more, capable of showing interpreted data to a user. The power supply is any of a variety of electrical power sources capable of providing adequate power to the processor, inner detecting sphere, outer detecting sphere, and display.

The second communicator is a device positioned relative to the first communicator that enables receipt, interpretation, and display of data from the first communicator. The second communicator comprises a frame, at least four entangled clocks, a plurality of light cords, an inner detecting sphere, an outer detecting sphere, a processor, a power supply, and a readout. In the preferred embodiment, the frame is a set of supports arranged in an equilateral pyramidal orientation. The frame comprises at least four corners. The at least four corners enable proper support and orientation of the at least four entangled clocks relative to the inner detecting sphere. Each entangled clock of the at least four entangled clocks of the second communicator reacts to changes in its respective paired entangled clock within the first communicator. With at least four entangled clocks on the two communicators, instantaneous directional changes in the second communicator are expressed as changes in the distances of each of the at least four entangled clocks relative to their partnered entangled clocks in the first communicator, and vice-versa. The plurality of light cords is a set of extruded cylindrical units, preferably fiber optic wires or similar materials capable of transmitting high-quality data from light inputs. In the preferred arrangement, the plurality of light cords connects the at least four entangled clocks to the inner detecting sphere and connects the inner detecting sphere to the outer detecting sphere. This arrangement enables measurement of the speed of light as it travels from the at least four entangled clocks to the inner detecting sphere, and as it subsequently bounces between the inner detecting sphere and the outer detecting sphere. The inner detecting sphere is a generally spherical optical sensor placed at the geometric center of the frame. The spherical shape enables receipt of signals from each of the at least four corners of the frame. The outer detecting sphere is a generally spherical optical sensor placed generally around the frame, so that the at least four corners of the frame each rest tangent to the outer detecting sphere, generally opposite the connecting points of the plurality of light cords to the inner detecting sphere. The processor is any of a variety of computer processors capable of converting signals from the outer detecting sphere into data that can be interpreted by humans and shown on the readout. In an exemplary embodiment, the processor comprises a math coprocessor. The math coprocessor is a supplemental logic core of the processor that enables calculation and mathematical interpretation of displacement results from the outer detecting sphere. The readout is any of a variety of displays, including flat screen, LCD screens, and more, capable of showing interpreted data to a user. The power supply is any of a variety of electrical power sources capable of providing adequate power to the processor, inner detecting sphere, outer detecting sphere, and display.

Further, after determining relative velocity and vector with respect to c, only three of the simultaneous light signals from the vertices of the pyramid of the first communicator may be required to determine direction. The fourth vector may be adjusted in the second communicator. Therefore, the velocity or time signal vector may be the same as that of another communicator or more than one communicators to maintain entangled communication. This may enable two or more entangled clocks or communication nodes to maintain entanglement at any distance apart.

Yet further, after establishing the c/v-v-m of a larger object (like a spaceship), the vertices of the pyramid (of the first communicator) may be used as sources for initiating light flashes in any suitable sequence. For example, patterns corresponding to zero c/v-v-m for the object may be generated at the inner detecting sphere. This may make faster than light (FTL) travel possible.

In an exemplary embodiment, a user acquires the relative-to-c velocity meter. The user places the first communicator of the relative-to-c velocity meter in a convenient location, and subsequently places the second communicator on any moving object, including but not limited to satellites, rockets, and other devices of astronomical interest. With the power supply of the first communicator and the power supply of the second communicator both active, the processor will assume that the current position is calibrated appropriately before displacement of the first communicator and second communicator begins. Alternatively, a variety of programs within the processor may enable the user to calibrate the relative-to-c velocity meter before displacement. Once calibrated, the first communicator and the second communicator may be theoretically separated by any distance. While separated, changes in the positions of the at least four entangled clocks of the first communicator will be reflected as changes within the at least four entangled clocks of the second communicator. The user may therefore manipulate the at least four entangled clocks of the conveniently located first communicator, by using the display and processor of the first communicator, to send signals that will be received instantaneously by the second communicator, processed by the processor of the second communicator, and displayed to another user proximal to the second communicator. Such communication will enable truly live updates between personnel on the ground and in space during astronomical voyages.

DESCRIPTION OF FIGURES

Figure 1:
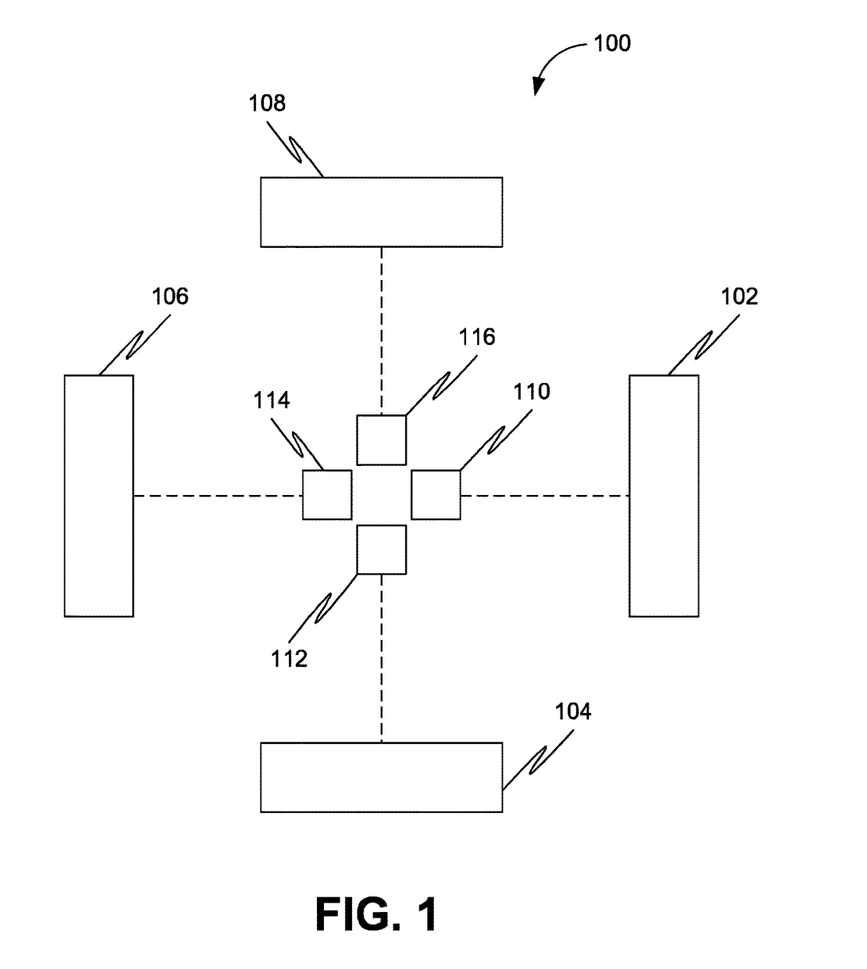
FIG. 1 is a block diagram of a first communicator of an apparatus for measuring a kinematic property of a first object relative to a second object, in accordance with some embodiments.

Now referring to figures, a first communicator 100 of an apparatus for measuring a kinematic property of a first object relative to a second object is shown in FIG. 1. The kinematic property may include one or more of position, speed, velocity and acceleration. The first communicator 100 may be associated with the first object. The apparatus may also include a second communicator (not shown) associated with the second object. For example, the first communicator 100 may be placed on the Earth (the second object) and the second communicator may be placed on a satellite (the first object). Accordingly, the disclosed apparatus may be used to measure a kinematic property of the satellite with respect to the Earth.

Further, the first communicator 100 may include a first frame (not shown) and at least four first entangled clocks 102-108 configured to periodically emit photons. The at least four first entangled clocks 102-108 may be disposed on the first frame. Further, the at least four first entangled clocks 102-108 may correspond to two orthogonal axes along which the apparatus may measure the kinematic property.

Further, the first communicator 100 may include a first plurality of photo detectors 110-116 corresponding to the at least four first entangled clocks 102-108. The plurality of first photo detectors may be configured to detect photons. As shown by the dotted lines, the first plurality of photo detectors 110-116 may be configured to detect photons emitted by the at least four first entangled clocks 102-108 respectively.

Yet further, the first communicator 100 may include a first processor (not shown) communicatively coupled to the first plurality of photo detectors 110-116. The first processor may be configured to compute a first kinematic property of the first object relative to the second object based on signals received from the first plurality of photo detectors 110-116. Further, the first communicator 100 may include a first power supply configured to provide electrical power to each of the at least four first entangled clocks 102-108, the first plurality of photo detectors 110-116 and the first processor.

Moreover, the second communicator may include a second frame and at least four second entangled clocks configured to periodically emit photons. Further, a quantum state of each of the at least four second entangled clocks may be entangled with a quantum state of a corresponding first entangled clock of the at least four first entangled clocks 102-108. Further, the second communicator may include a second plurality of photo detectors corresponding to the at least four second entangled clocks. The second plurality of photo detectors may be configured to detect photons. Further, the second communicator may include a second power supply configured to provide electrical power to each of the at least four second entangled clocks and the second plurality of photo detectors.

In further embodiments, the second communicator may also include a second processor communicatively coupled to the plurality of second photo detectors. The second processor may be configured to compute a second kinematic property of the second object relative to the first object based on signals received from the second plurality of photo detectors. Yet further, the first processor may include a first math coprocessor configured for calculation and mathematical interpretation of displacement results from the first plurality of photo detectors. Further, the second processor may include a second math coprocessor configured for calculation and mathematical interpretation of displacement results from the second plurality of photo detectors.

In further embodiments, the first communicator 100 further may include a first readout (not shown) configured to display the first kinematic property. Further, the second communicator further may include a second readout configured to display the second kinematic property.

In some embodiments, each of the at least four first entangled clocks 102-108 reacts to changes in a corresponding second entangled clock. An instantaneous directional change associated with the first communicator 100 may be expressed as a change in distances of each of the at least four first entangled clocks 102-108 relative to corresponding at least four second entangled clocks in the second communicator.

Moreover, as long as the optical distances between the entangled clocks and corresponding photo detectors are known a-priori, the actual arrangement (or spatial configuration) of the entangled clocks and photo detectors may be arbitrary. Accordingly, in some embodiments, the photo detectors may be placed in a central region of a frame and the entangled clocks may be placed at the peripheral region of the frame.

Figure 2:
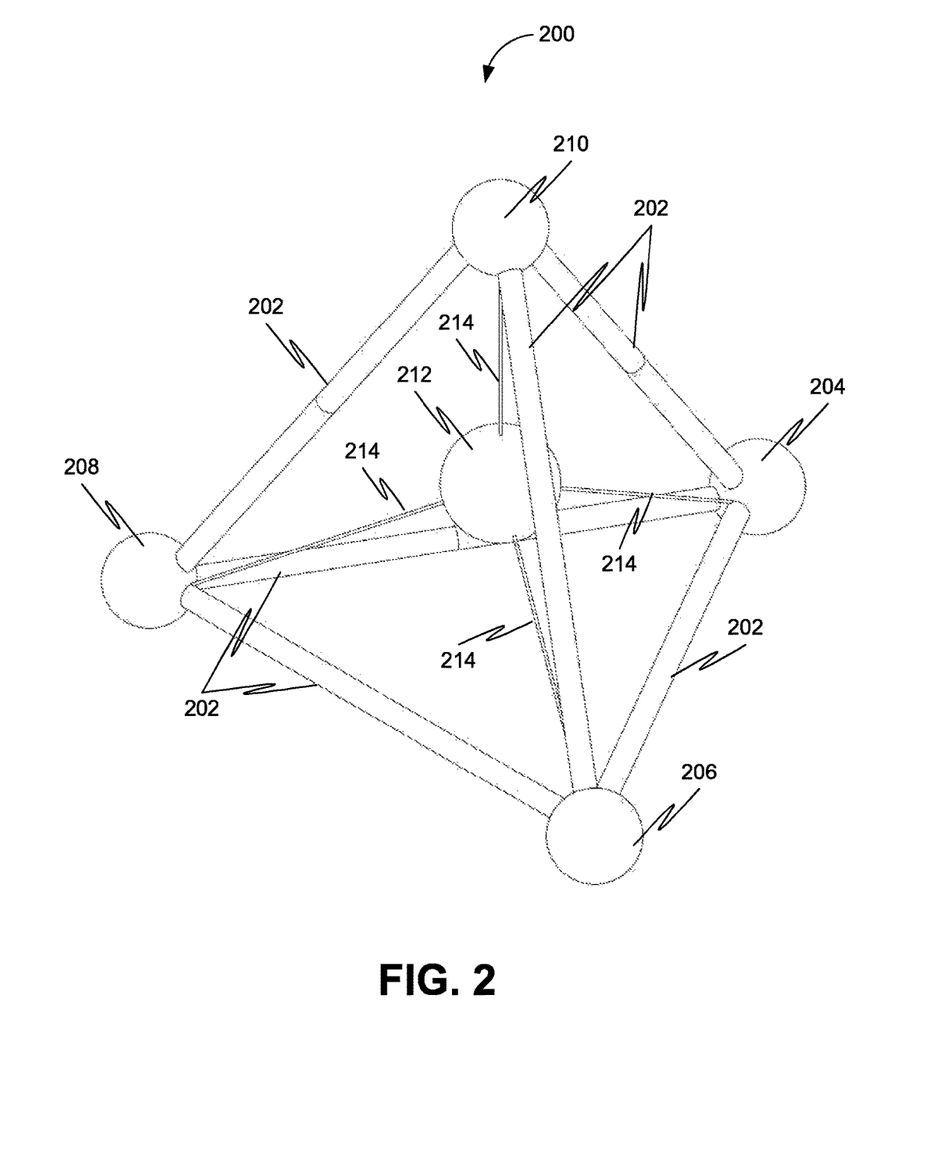
FIG. 2 is a perspective view of a first communicator of an apparatus for measuring a kinematic property of a first object relative to a second object, in accordance with some embodiments.

FIG. 2 is a perspective view of a first communicator 200 of an apparatus for measuring a kinematic property of a first object relative to a second object, in accordance with some embodiments. The first communicator 200 may be associated with the first object. The apparatus may also include a second communicator (not shown) associated with the second object.

Figure 3:
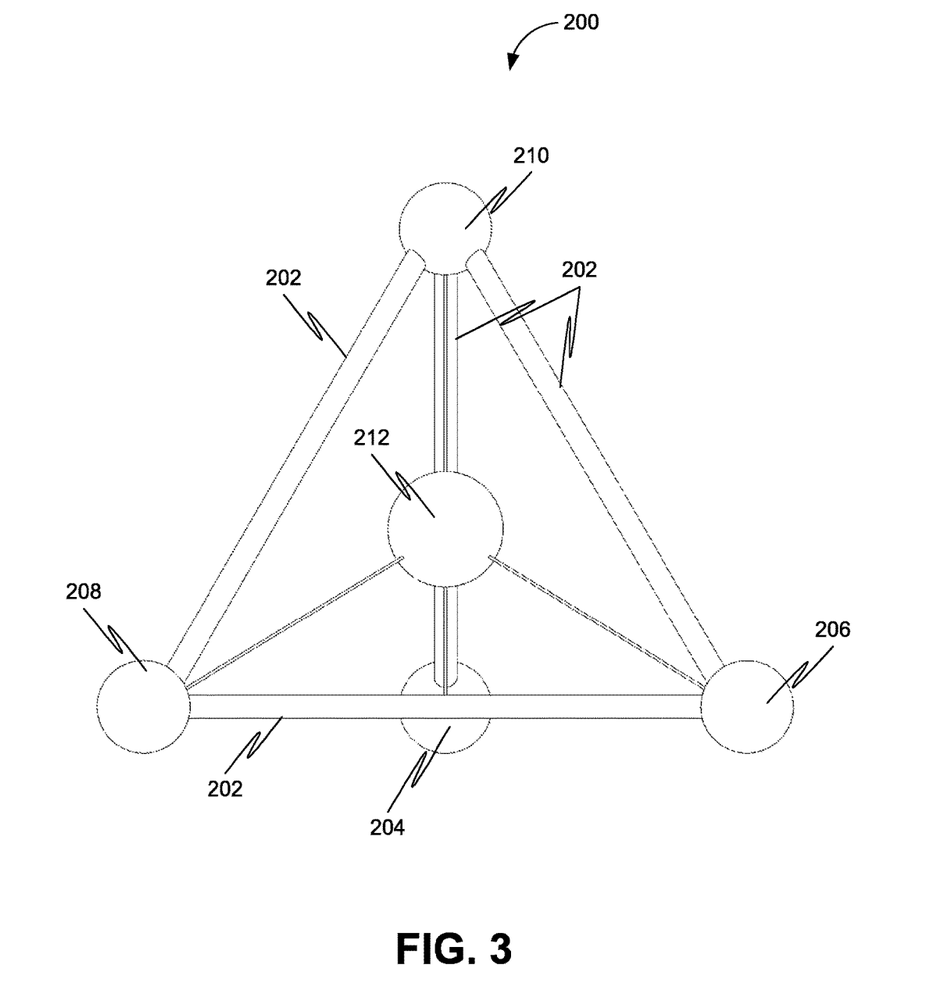
FIG. 3 is a side view of the first communicator of FIG. 2.
Figure 4:
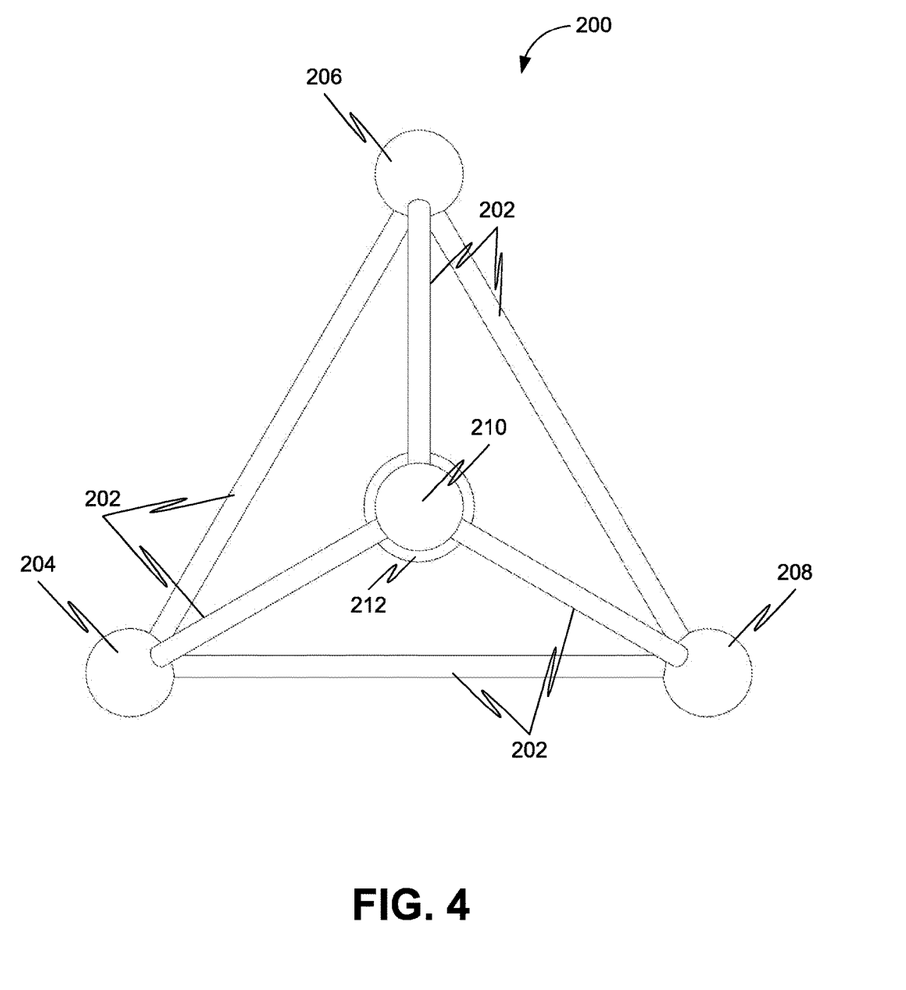
FIG. 4 is a top view of the first communicator of FIG. 2.

As shown, the first communicator 200 includes a first frame 202. Each of the first frame 202 and a second frame (not shown) comprises a set of supports arranged in an equilateral pyramidal orientation with four corners. Entangled clocks 204-210 may be placed at the peripheral region of the frame 202, specifically on the four corners of the equilateral pyramid. As shown, each of the entangled clocks 204-210 may be spherical in form. The photo detectors corresponding to the entangled clocks 204-210 may be placed in a central region 212 (in a spherical ball) of the frame 202. FIG. 3 is a side view of the first communicator 200. FIG. 4 is a top view of the first communicator 200. In an alternate embodiment, the entangled clocks may be placed in the central region of the frame 202 and photo detectors corresponding to the entangled clocks may be placed on the vertices of the frame 202.

In some embodiments, the first communicator 200 may further include a first plurality of light cords 214 configured to transmit light. The plurality of light cords 214 may include fiber optic wires.

Figure 5:
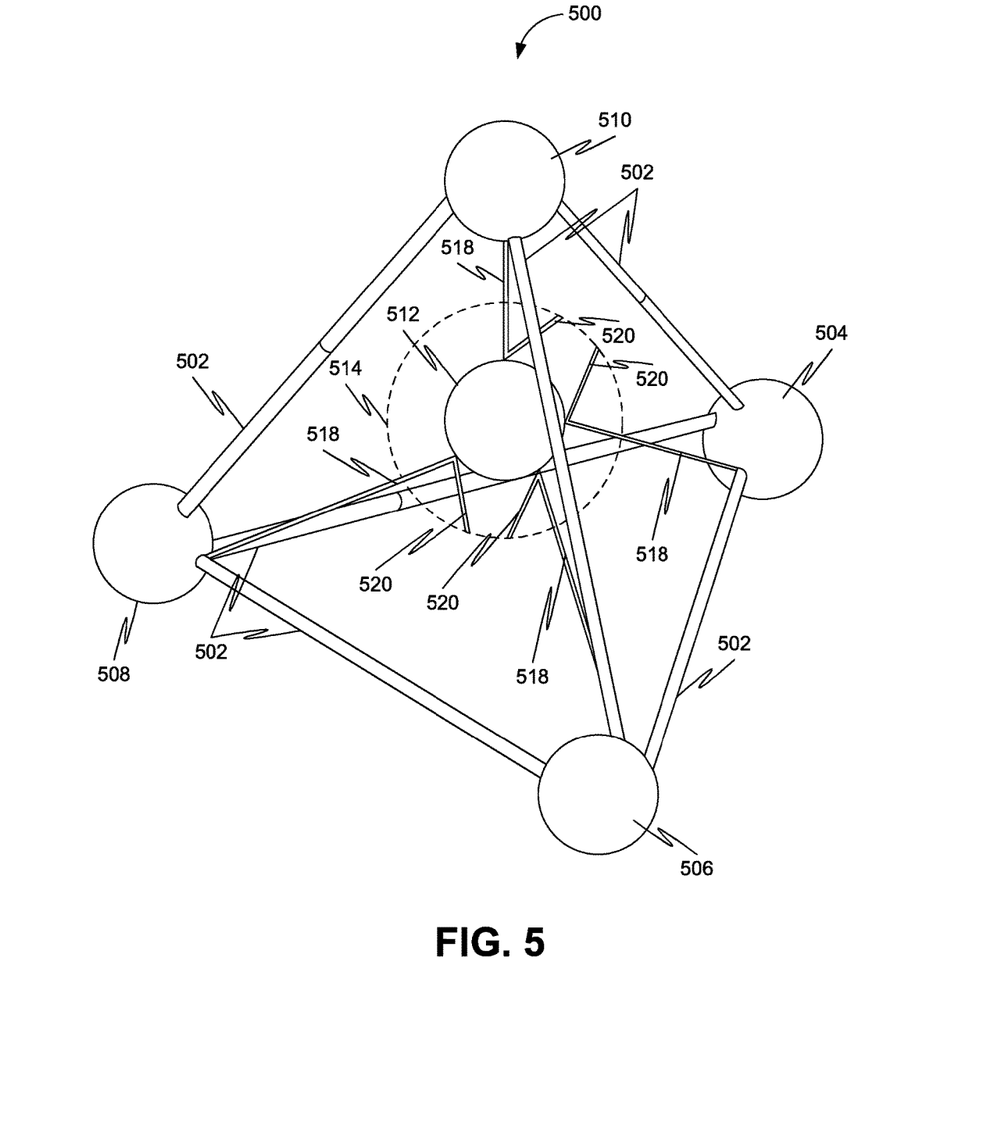
FIG. 5 is a perspective view of a first communicator of an apparatus for measuring a kinematic property of a first object relative to a second object, in accordance with some embodiments.

FIG. 5 is a perspective view of a first communicator 500 of an apparatus for measuring a kinematic property of a first object relative to a second object, in accordance with some embodiments. The first communicator 500 may be associated with the first object. The apparatus may also include a second communicator (not shown) associated with the second object.

The first communicator 500 is similar to the first communicator 200. As shown, the first communicator 500 includes a first frame 502, a first plurality of entangled clocks 504-510 and a first plurality of photo detectors corresponding to the first plurality of entangled clocks 504-510. The first plurality of photo detectors may include a first inner photo detector 512 disposed at a geometric center of the frame 502. The first inner photo detector 512 may be configured to detect photons. Further, the first plurality of photo detectors may include a first outer photo detector 514 concentrically disposed around the first inner photo detector 512. The first outer photo detector 514 may be configured to detect photons.

The first communicator 500 may further include a first plurality of light cords configured to transmit light. Further, a first set 518 of the first plurality of light cords connects the at least four first entangled clocks 504-510 to the first inner photo detector 512 (the first inner detecting sphere 512). Further, a second set 520 of the first plurality of light cords connects the first inner photo detector 512 to the first outer photo detector 514 (the first outer detecting sphere 514).

Similarly, the second communicator (not shown) may include a second frame, a second plurality of entangled clocks and a second plurality of photo detectors corresponding to the second plurality of entangled clocks. The second plurality of photo detectors may include a second inner photo detector disposed at a geometric center of the frame. The second inner photo detector may be configured to detect a photon. Further, the second plurality of photo detectors may include a second outer photo detector concentrically disposed around the second inner photo detector. The second outer photo detector may be configured to detect a photon. The second communicator may further include a second plurality of light cords configured to transmit light. Further, a second set of the second plurality of light cords connect the at least four second entangled clocks to the second inner photo detector (the second inner detecting sphere). Further, a second set of the second plurality of light cords connects the second inner detecting sphere to the second outer photo detector (the second outer detecting sphere).

Further, the first communicator 500 may include a first processor communicatively coupled to the first outer photo detector 514. The first processor may be configured to compute a first kinematic property of the first object based on signals received from the first outer photo detector 514.

In some embodiments, the first frame may include at least four first corners. Further, the at least four first corners may be configured to support the at least four first entangled clocks relative to the first inner photo detector. Further, the second frame may include at least four second corners. Further, the at least four second corners may be configured to support the at least four second entangled clocks relative to the second inner photo detector.

In some embodiments, each of the first inner photo detector, the first outer photo detector, the second inner photo detector and the second outer photo detector may be spherical in form.

Figure 6:
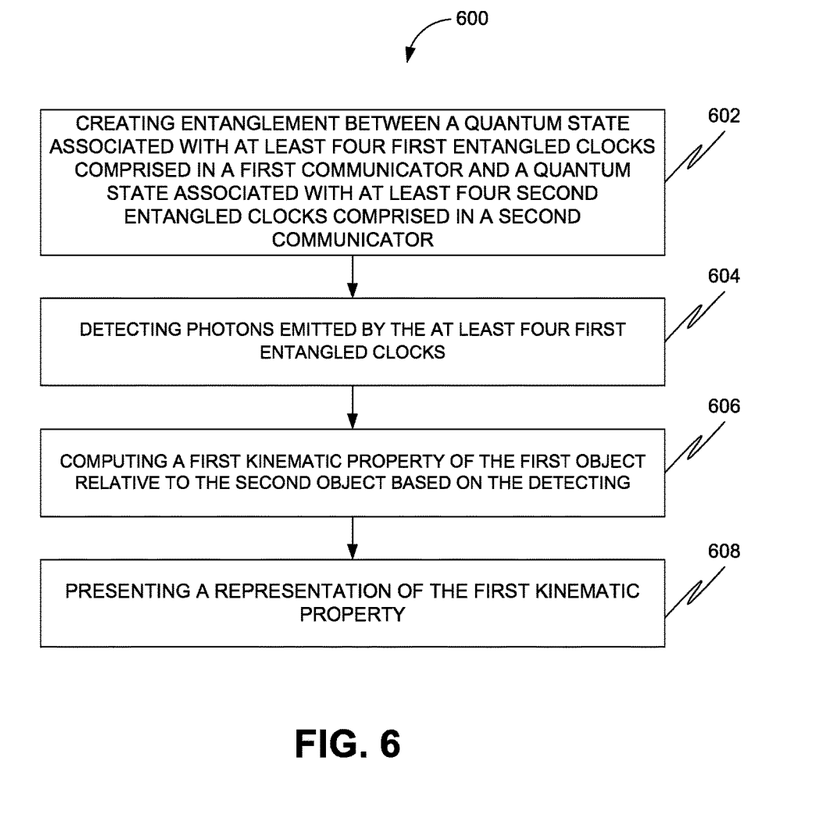
FIG. 6 is a flow chart of a method for measuring a kinematic property of a first object relative to a second object, in accordance with some embodiments.

FIG. 6 is a flow chart of a method 600 for measuring a kinematic property of a first object relative to a second object, in accordance with some embodiments. At 602, the method 600 may include creating entanglement between a quantum state associated with the at least four first entangled clocks 102-108 comprised in the first communicator 100 and a quantum state associated with the at least four second entangled clocks comprised in the second communicator. Further, each of at least four first entangled clocks 102-108 and the at least four second entangled clocks may be configured to emit photons.

Then, at 604, the method 600 may include detecting, using the first plurality of photo detectors 110-116 comprised in the first communicator 100, photons emitted by the at least four first entangled clocks 102-108.

Further, at 606, the method 600 may include computing, using the first processor comprised in the first communicator 100, a first kinematic property of the first object relative to the second object based on the detecting (at 604). This is explained in further detail in conjunction with FIG. 7 below.

In some embodiments, the first processor may be configured for computing the kinematic property of the first object based on a plurality of time instants corresponding to the detecting of photons by the first plurality of photo detectors 110-116.

Thereafter, at 608, the method 600 may include presenting, using a first readout comprised in the first communicator 100, a representation of the first kinematic property.

Figure 7:
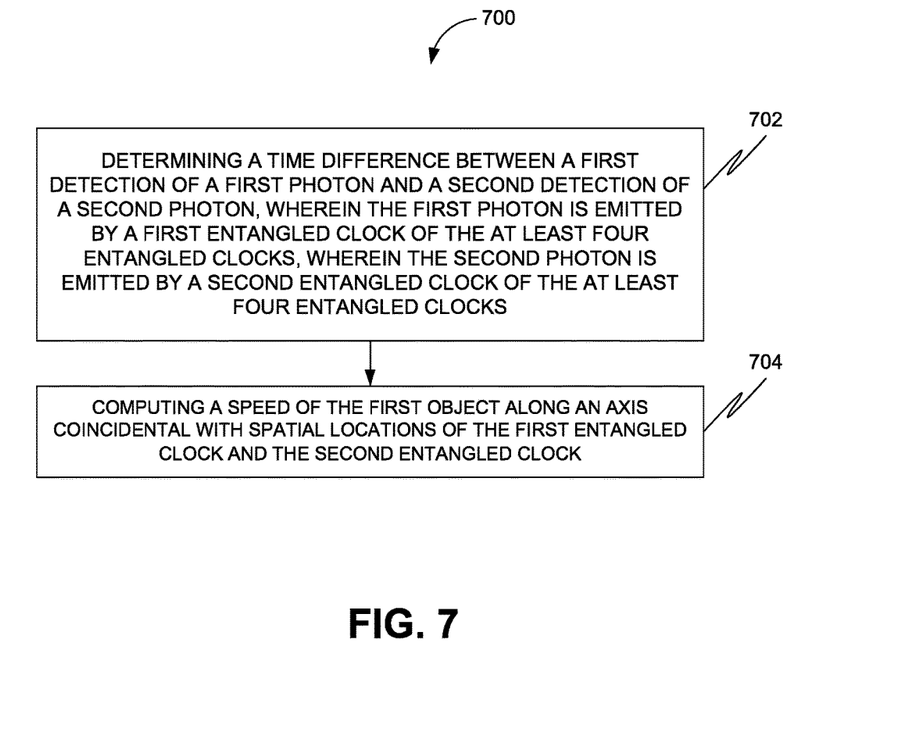
FIG. 7 is a flow chart of a method for computing a kinematic property of a first object relative to a second object, in accordance with some embodiments.

FIG. 7 is a flow chart of a method 700 for computing a kinematic property of a first object relative to a second object, in accordance with some embodiments. At 702, the method 700 includes determining a time difference between a first detection of a first photon by a first photo detector of the first plurality of photo detectors 110-116 and a second detection of a second photon by a second photo detector of the first plurality of photo detectors 110-116. Further, the first photon may be emitted by a first entangled clock of the at least four entangled clocks 102-108 and the second photon may be emitted by a second entangled clock of the at least four entangled clocks 102-108. Further, a first optical distance between the first entangled clock and the first photo detector may be identical to second optical distance between the second entangled clock and the second photo detector.

At 704, the method 700 includes computing, a speed of the first object along an axis coincidental with spatial locations of the first entangled clock and the second entangled clock. Further, the speed may be computed based on the time difference.

Further, each of the at least four first entangled clocks 102-108 reacts to changes in a corresponding second entangled clock. Accordingly, an instantaneous directional change associated with the first communicator 100 may be expressed as a change in distances of each of the at least four first entangled clocks 102-108 relative to corresponding at least four second entangled clocks in the second communicator.

In some embodiments, the first communicator 100 may include a first frame including at least four first corners. Further, the at least four first corners may be configured to support the at least four first entangled clocks 102-108 relative to the first plurality of photo detectors 110-116. Further, the second communicator may include a second frame including at least four second corners. Further, the at least four second corners may be configured to support the at least four second entangled clocks relative to the plurality of second photo detectors. Further, each of the first frame and the second frame may include a set of supports arranged in an equilateral pyramidal orientation.

Supplemental Description of Invention

In other words, the present invention is a relative-to-light-speed, velocity-and-vector meter (c/v-v meter) that enables instant entangled communication between c/v-v meters to interstellar distances. The present invention is able to determine, for its own or any object it is on or within, the relative speed and vector of the object with respect to the speed of light. The present invention comprises the following features: the simplest pyramid made of four equal sized equilateral triangle faces that have six equal length rigid edges ending in four vertexes; four light tubes, one running from each vertex to meet at the exact center of the pyramid; four entangled clocks, each attached to a light emitter, one clock/emitter on end of the light tube ending on each vertex; each light emitting entangled clock to have its own unique assignable light frequency; these clocks are entangled to tick/flash simultaneously at constant equal intervals, or each can get triggered to flash independently of the others; when the entangled clock/emitters flash simultaneously, they send a light signal down the equal in length light carrying speed light tubes to a "light detecting ball" at the exact center of the pyramid where the light tubes meet on its surface at known locations; a detector attached to 'light detecting ball' reads the four unique light frequencies flash arrival times, or any other chosen number of light tube signals, and sends these signals to a computer to calculate the c/v-v of this measuring tool, and displays it on a readout, and stores it in memory; and a power supply to run all of this.

Moreover, the present invention places a second c/v-v meter (or more) inside or next to the base c/v-v meter to match any other entangled communication devices velocity frequency allowing for instant entangled communication at any distance up to interstellar. Thus, the first or outer c/v-v meter is used to determine the velocity and vector of the combined object (e.g. a spaceship or satellite). The first c/v-v meter's actual reading is then used to determine, by a computer algorithm, which three vertexes of the second meter have to flash in what sequence to set the vector setting of the second meter. Afterwards, the fourth "speed" vector of the entangled clock of the second c/v-v meter is set to flash at the desired entangled frequency. This process can be used for any number of inner or attached meters so as to maintain entangled communication with as many communication nodes as desired. Alternatively, the fourth "speed" vector of the inner entangled device can be adjusted using the control panel to switch between entangled communication frequencies. Finally, a method is selected for sending information, such as varying light frequency of the fourth "speed" vector or switching it on off like a Morse code signal.

The present invention can be used to scan likely entangled frequencies that other extra-terrestrial (E-T) civilizations could be implementing. In order to accomplish this, the communication nodes here on Earth can be set to probable entangled velocity frequencies (e.g. a low prime number) that E-T planets with c/v-v meters would use for public communication with each other. A common denominator frequency would be in Planck units near zero, and an appropriate frequency to start is 33 h units.

In addition, the present invention can be configured to entangle the outer ends of as many light tubes as required from any point on the surface of an object running to a known point on the detection center or any other inner detecting point chosen. In order to accomplish this, the entangled flash clocks on the outer flash initiating end of light tubes need to run to the detector. A computer controller signals which flash ends in order to flash in any desired sequence, taking into account the time that a flash signal takes to reach detecting point.

Furthermore, the present invention uses a c/v-v meter around a spaceship or object in order to show which vector needs to be used to decelerate the object to zero with respect to the speed of light. In order to accomplish this, the present invention further comprises the following arrangement of features: an outer c/v-v meter; an inner communication c/v-v meter; a control panel that uses readings from inner communication c/v-v meter to control ship or object; appropriate rockets to decelerate object to zero/c; a means to disappear and reappear; a means of observing stars around object to determine its location with respect to the operators of the present invention; the entangled c/v-v meter tied to the spaceship's control panel so that the operators can control spaceship from afar; and finally try and bring the spaceship home. In conclusion, given the aforementioned features and steps, the present invention allows the zero/c spaceship to disappear, then it is conclusively proved that the current universe geometry is a Moebius geometry universe. Moreover, the present invention allows communication with interstellar civilizations and have a path for faster-than-light travel.

In addition, the c/v-v meters are functionally independent to each other. A premise for the present invention is that each c/v-v meter are above some entangled clock flash rate on vertexes, which implies each c/v-v meter needs to be independently powered or share a common power source. The posited flash rate is estimated at a thousand times per second, more or less. Thus, the posited flash rate implies high flash rate entangled clocks for our 4 vertex ends or any other outer ends. Entangled clock flashers include the following requirements: to be entangled; to be tunable, or in other words, to be able to change frequency flash rate upon direction from the computer controller; to be able to emit unique light frequency; and to have flashtube ends in "known to the computer controller" location on detecting sphere, then the computer controller only needs to know sequence of flash arrival times from four vertexes to calculate vector, or in other words, three flashes with fourth being velocity.

Although the invention has been explained in relation to its preferred embodiment, it is to be understood that many other possible modifications and variations can be made without departing from the spirit and scope of the invention.

We claim:

1. An apparatus for measuring a kinematic property of a first object relative to a second object, the apparatus comprising:
 a first communicator associated with a first object, the first communicator comprising:
  a first frame;

at least four first entangled clocks configured to periodically emit photons, wherein the at least four first entangled clocks are disposed on the first frame;
a first plurality of photo detectors corresponding to the at least four first entangled clocks, wherein the plurality of first photo detectors is configured to detect photons;
a first processor communicatively coupled to the first plurality of photo detectors, wherein the first processor is configured to compute a first kinematic property of the first object relative to the second object based on signals received from the first plurality of photo detectors;
a first power supply configured to provide electrical power to each of the at least four first entangled clocks, the plurality of first photo detectors and the first processor; and
a second communicator associated with a second object, the second communicator comprising:
a second frame;
at least four second entangled clocks configured to periodically emit photons, wherein a quantum state of each of the at least four second entangled clocks is entangled with a quantum state of a corresponding first entangled clock of the at least four first entangled clocks;
a second plurality of photo detectors corresponding to the at least four second entangled clocks, wherein the plurality of second photo detectors is configured to detect photons; and
a second power supply configured to provide electrical power to each of the at least four second entangled clocks and the second plurality of photo detectors.

2. The apparatus of claim 1, wherein:
the first plurality of photo detectors comprises:
a first inner photo detector disposed at a geometric center of the frame, wherein the first inner photo detector is configured to detect photons; and
a first outer photo detector concentrically disposed around the first inner photo detector, wherein the first outer photo detector is configured to detect photons, wherein the first processor is communicatively coupled to the first outer photo detector, wherein the first processor is configured to compute a first kinematic property of the first object based on signals received from the first outer photo detector; and
the second plurality of photo detectors comprises:
a second inner photo detector disposed at a geometric center of the frame, wherein the second inner photo detector is configured to detect a photon; and
a second outer photo detector concentrically disposed around the second inner photo detector, wherein the second outer photo detector is configured to detect a photon.

3. The apparatus of claim 1, wherein each of the first frame and the second frame comprises a set of supports arranged in an equilateral pyramidal orientation.

4. The apparatus of claim 2, wherein the first frame comprises at least four first corners, wherein the at least four first corners are configured to support the at least four first entangled clocks relative to the first inner photo detector, wherein the second frame comprises at least four second corners, wherein the at least four second corners are configured to support the at least four second entangled clocks relative to the second inner photo detector.

5. The apparatus of claim 1, wherein each of the at least four first entangled clocks reacts to changes in a corresponding second entangled clock.

6. The apparatus of claim 5, wherein, an instantaneous directional change associated with the first communicator is expressed as a change in distances of each of the at least four first entangled clocks relative to corresponding at least four second entangled clocks in the second communicator.

7. The apparatus of claim 2, wherein each of the first inner photo detector, the first outer photo detector, the second inner photo detector and the second outer photo detector is spherical in form.

8. The apparatus of claim 1, wherein:
the first communicator further comprises a first readout configured to display the first kinematic property; and
the second communicator further comprises a second readout configured to display the second kinematic property.

9. The apparatus of claim 1, wherein the second communicator further comprises a second processor communicatively coupled to the plurality of second photo detectors, wherein the second processor is configured to compute a second kinematic property of the second object relative to the first object based on signals received from the second plurality of photo detectors.

10. The apparatus of claim 9, wherein the first processor comprises a first math coprocessor configured for calculation and mathematical interpretation of displacement results from the first plurality of photo detectors, wherein the second processor comprises a second math coprocessor configured for calculation and mathematical interpretation of displacement results from the second plurality of photo detectors.

11. The apparatus of claim 1, wherein:
the first communicator further comprises a first plurality of light cords configured to transmit light, wherein a first set of the first plurality of light cords connect the at least four first entangled clocks to the first inner detecting sphere, wherein a second set of the first plurality of light cords connect the first inner detecting sphere to the first outer detecting sphere; and
the second communicator further comprises a second plurality of light cords configured to transmit light, wherein a second set of the second plurality of light cords connect the at least four second entangled clocks to the second inner detecting sphere, wherein a second set of the second plurality of light cords connect the second inner detecting sphere to the second outer detecting sphere.

12. The apparatus of claim 11, wherein the plurality of light cords comprises fiber optic wires.

13. The apparatus of claim 1, wherein the kinematic property comprises at least one of position, speed, velocity and acceleration.

14. A method of measuring a kinematic property of a first object relative to a second object, the method comprising:
creating entanglement between a quantum state associated with at least four first entangled clocks comprised in a first communicator and a quantum state associated with at least four second entangled clocks comprised in a second communicator, wherein each of at least four first entangled clocks and the at least four second entangled clocks is configured to emit photons;
detecting, using a plurality of first photo detectors comprised in the first communicator, photons emitted by the at least four first entangled clocks;

computing, using a first processor comprised in the first communicator, a first kinematic property of the first object relative to the second object based on the detecting; and presenting, using a first readout comprised in the first communicator, a representation of the first kinematic property.

15. The method of claim 14, wherein the first processor is configured for computing the kinematic property of the first object based on a plurality of time instants corresponding to the detecting of photons by the plurality of first photo detectors.

16. The method of claim 14, wherein the computing comprises:

determining a time difference between a first detection of a first photon by a first photo detector of the plurality of first photo detectors and a second detection of a second photon by a second photo detector of the plurality of first photo detectors, wherein the first photon is emitted by a first entangled clock of the at least four entangled clocks, wherein the second photon is emitted by a second entangled clock of the at least four entangled clocks, wherein a first optical distance between the first entangled clock and the first photo detector is identical to second optical distance between the second entangled clock and the second photo detector; and computing, a speed of the first object along an axis coincidental with spatial locations of the first entangled clock and the second entangled clock, wherein the speed is computed based on the time difference.

17. The apparatus of claim 14, wherein the first communicator comprises a first frame comprising at least four first corners, wherein the at least four first corners are configured to support the at least four first entangled clocks relative to the plurality of first photo detectors, wherein the second communicator comprises a second frame comprising at least four second corners, wherein the at least four second corners are configured to support the at least four second entangled clocks relative to the plurality of second photo detectors.

18. The apparatus of claim 17, wherein each of the first frame and the second frame comprises a set of supports arranged in an equilateral pyramidal orientation.

19. The apparatus of claim 14, wherein each of the at least four first entangled clocks reacts to changes in a corresponding second entangled clock.

20. The apparatus of claim 19, wherein, an instantaneous directional change associated with the first communicator is expressed as a change in distances of each of the at least four first entangled clocks relative to corresponding at least four second entangled clocks in the second communicator.

* * * * *